May 11, 1965  C. H. SCHAAR  3,183,116
METHOD OF MAKING PERFORATED ADHESIVE TAPES
Original Filed March 14, 1960  3 Sheets-Sheet 1

INVENTOR.
Charles H. Schaar
BY
Atty.

May 11, 1965

C. H. SCHAAR 3,183,116

METHOD OF MAKING PERFORATED ADHESIVE TAPES

Original Filed March 14, 1960

INVENTOR.
Charles H. Schaar
BY
Atty.

INVENTOR.
Charles H. Schaar
BY
Atty.

3,183,116
METHOD OF MAKING PERFORATED ADHESIVE TAPES
Charles H. Schaar, Chicago, Ill., assignor to The Kendall Company, Boston, Mass., a corporation of Massachusetts
Original application Mar. 14, 1960, Ser. No. 14,644, now Patent No. 3,073,303, dated Jan. 15, 1963. Divided and this application Oct. 16, 1962, Ser. No. 230,831
10 Claims. (Cl. 117—98)

This invention relates to perforated adhesive tapes and to a method of coating an adhesive onto a perforated backing. In particular, this invention relates to surgical adhesive tapes having a thermoplastic film coated on at least one side with a pressure-sensitive adhesive, said backing having perforations uniformly distributed throughout the film as hereinafter described.

Maceration of the skin in the area covered by an adhesive bandage has been a problem of long standing in the surgical tape field. Maceration of the skin in the area in contact with the adhesive of the tape, and maceration of the skin under the pad or compress covered by the tape have been problems not only with conventional fabric adhesive tapes but also with plastic film adhesive tapes.

The area of the skin in adhesive contact with the bandage is usually sealed off from external sources of water. Therefore, maceration which occurs in the skin areas in contact with the adhesive is due primarily, if not solely, to the entrapment of water or fluids from internal sources such as the sweat glands and the amount of water ordinarily on the surface of the skin and in the skin tissues. If the bandage is retained on the skin for a length of time, depending upon the individual, the skin in contact with the adhesive underneath the bandage eventually may become waterlogged, that is, macerated. The skin becomes whitened, and in severe cases may be accompanied with swelling of the skin tissue. In particularly severe cases the removal of the bandage may pull and peel off the macerated skin area, causing considerable pain.

Maceration under the compress or pad covered by the adhesive tape may be caused not only by internal sources of water or fluids, as explained above, but may be enhanced by moisture absorbed in the compress or pad from external sources. Thus, if the pad comes in contact with water, such as during washing of the hands in case of a bandage on the hands, the pad may become soaked with water. Under these circumstances, maceration which may result is due not only to the internal sources of moisture, but also the moisture brought into contact with the skin from external sources.

In observing the problem of maceration underneath an adhesive bandage, it was readily apparent to those skilled in the art that maceration could be substantially reduced, if not completely eliminated, by proper ventilation of the area of the skin covered by the tapes. This was recognized even prior to the advent of the use of thermoplastic films as backings for adhesive bandages. Ventilation has been obtained to some degree by cutting or punching holes in the fabric or film backing. It was readily noted that the area of skin coincident with the hole in the backing was substantially free of maceration and had its normal healthy color. In many cases, it was observed that the area of non-macerated skin was somewhat larger than the area of the opening in the backing, indicating that the areas vented by such openings included not only the areas exactly coincident with the peripheral edges of the openings, but also adjacent areas extending beyond the edges of the openings. Insofar as the area of non-maceration was larger than the area circumscribed by the opening itself, it was obvious that the solution to the problem of maceration existed in suitable choice of a large number of openings and proper placement of the same throughout the tape.

The intended object of a tape with a large number of perforations therein was to reduce the distance between adjacent openings. Ideally, the distance between the openings should be that which provides overlapping areas ventilated by adjacent openings. The minimum distance for a surgical adhesive tape would be that which would provide at least contiguous ventilated areas under the tape, in areas under both the pad or compress covered by the backing and under the tape in direct contact with the skin.

The distance between adjacent openings in a tape depend upon the size and the number of openings that can be distributed throughout the tape. The size and number of the openings permissible in a tape backing, in turn, depend upon the effect of the same upon the physical properties of the backing, the covering and protection functions served by the tape, and, as will be shown, the structure of the perforated backing.

As to be expected, punched or die-cut openings in thermoplastic films, suitable in their imperforate form for surgical tape purposes, reduce the physical strength properties of the film. For example, the tensile strength and tear resistance of the film can be substantially reduced by a few large or a plurality of small punched openings. The tear resistance of this type of a perforated film is deleteriously effected.

The effect of cut holes on the physical properties in the portions of the plastic backing over the pad is not as important as the effect on the tape extending beyond the pad. Conventionally, the pad is adhered to the tape by the coating of the adhesive on the tape and therefore serves as a laminated reinforcing means for that portion of the tape to which it is attached. Preferably, the size of the openings in the backing should be small, rather than large, so as to better protect the area covered by the tape from contaminating dirt particles. Under conditions of normal exposure, a tape with small openings will maintain a cleaner and neater appearance than a tape with larger openings, thereby reducing the necessity for frequent changes for appearance sake only.

Another practical problem in the manufacture of a ventilated adhesive tape is the problem of applying the adhesive to a perforated film. In cut-perforated tape this is avoided by cutting the openings in the tape after the imperforate film has been coated with the adhesive. Rather than adhesively coating the film, it has been proposed to apply an adhesive-impregnated open-mesh fabric to one side of a perforated film; see U.S. Patent 2,740,403. Although this technique has an advantage in that the laminations of the fabric reinforces the weakened perforated film in the same manner as a gauze pad reinforces the perforated film directly over the pad, it is difficult to laminate the open-mesh fabric to the perforated film without blocking some of the openings by the impregnated yarns of the fabric.

In general, in accordance with this invention a ventilated adhesive tape particularly suitable as a surgical adhesive tape is made with a perforated thermoplastic film having portions of the matrix of the film surrounding the openings defined by the perforations greater than the thickness of the remaining matrix of the perforated film. The entire matrix is coated with a suitable adhesive and the perforations therein are free of adhesive. The amount of film material represented by the openings produced in the film is not removed therefrom and wasted, but is integrally incorporated in the film matrix and localized in the portions thereof immediately contiguous with and surrounding the perforations. In accordance with this invention a perforated adhesive tape may be manufactured by adhesively coating a perforated backing without clogging the perforations with adhesive during the coating operation.

Among the objectives of this invention is a perforated plastic adhesive tape having a substantial number of holes preferably distributed substantially uniformly throughout the length and width of said tape. An object of this invention is a perforated adhesive tape having a greater resistance to tearing than the same tape in its imperforate form. Generally, an object of this invention is a perforated thermoplastic film backed tape, having physical properties generally superior to a tape having cut-out perforations in the thermoplastic film backing.

A particular object of this invention is a ventilated plastic adhesive tape having a substantial number of perforations of sufficient size and number distributed in close relationship to each other throughout the tape to ventilate at least contiguous areas underneath said tape.

A further object of this invention is a process for applying an adhesive coating to a perforated backing suitable for tape purposes to produce a perforated tape free of adhesive in the perforations.

These objects and other advantages will become apparent in view of the following detailed description and the drawings in which.

Figure 1:
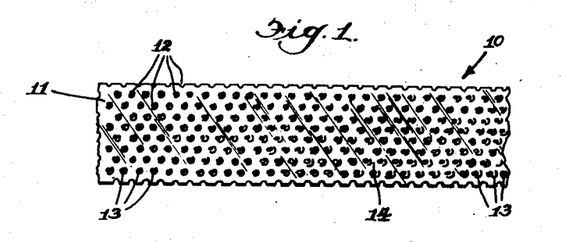
FIGS. 1 and 2 are enlarged diagrammatic planar views of portions of adhesive tapes of this invention.
Figure 2:
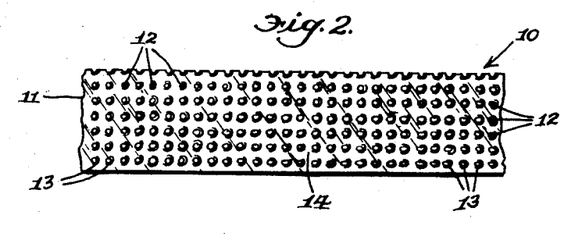
Figure 3:
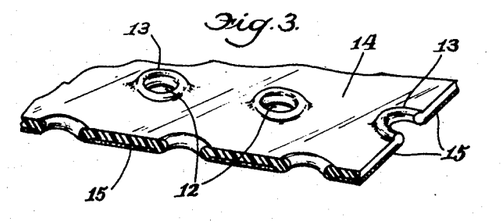
FIG. 3 is an enlarged diagrammatic cross-sectional, partly perspective view of a portion of the adhesive tape shown in FIG. 1.

With regard to the adhesive tapes illustrated in FIGS. 1–5, it is emphasized that the drawings are diagrammatic and, for FIGS. 1–3, represent only the draftsman's approximations of the construction of the tapes of this invention as viewed under magnification. Accordingly, it is to be understood that the diagrammatic illustrations are not necessarily accurate pictorial views of the actual products of the invention.

Figure 4:
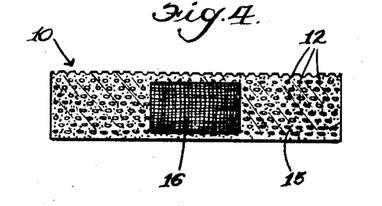
FIGS. 4 and 5 are diagrammatic planar views of adhesive tape bandages made in accordance with this invention.
Figure 5:
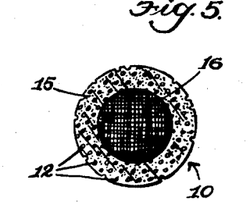

The adhesive tape of this invention is generally designated by the numeral 10 in FIGS. 1–5, the tape being shown in the form of a finger bandage in FIG. 4 and a spot bandage in FIG. 5. The numeral 11 designates a plastic film backing, the underside of which is coated with a pressure-sensitive adhesive 15, as shown in FIG. 3. The film 11 is perforated with holes or openings 12 preferably distributed substantially uniformly throughout the tape so that adjacent openings are substantially uniformly spaced from each other. The holes, of course, may be arranged in any suitable pattern. As shown in FIG. 1, the holes are arranged in a staggered pattern and in FIG. 2 in a substantially straight pattern. Surrounding each of the holes 12 is a film portion 13 integral with the remaining matrix 14 of the film 11. The film portion 13 is thicker than the remaining film matrix 14 and actually is formed in part by the film portion previously existing in the portion of the film represented by the opening which it surrounds. This thickened film portion 13 is part of the film itself, having been melted, caused to move to define an opening in the film and then subjected to localized cooling to confine the material in a thickened portion surrounding the opening.

A diagrammatic approximation of this structure is shown in FIG. 3, which is an enlarged cross-sectional view, partly in perspective, of a portion of the tape cut through one of the row of holes in the tape of FIG. 1. The thickened film portions 13 surrounding the openings 12 may be likened to grommet-like formations. These grommet-like portions have an important influence upon the physical characteristics of the thermoplastic film. As will appear subsequently, tapes made with perforated films devoid of these grommet-like formations are substantially weaker in a number of respects than the tapes of the invention, particularly in tapes having a substantially large number of perforations.

FIGURES 4 and 5 are examples of adhesive tape bandages made in accordance with this invention, wherein a suitable pad or compress 16 for absorbing wound fluids is positioned on the adhesive-coated side of the tape. The bandages are perforated throughout the entire surface of the tape to provide ventilation in the areas covered by the pad and by the tape portions extending beyond the pad. FIGS. 4 and 5 are planar views of the bandages as viewed from the adhesively coated side of the tape. The pad 16 is held in position by the adhesive coating 15 in that portion of the tape covered by the pad.

Since the area ventilated by an opening is somewhat larger than the area of the opening itself, an efficient way to maximize the ventilation, of course, is to put as many holes in the tape as possible, the holes being at least of sufficient size to pass fluid. Preferably, the openings should be no smaller than that equivalent to a circular opening having a diameter not substantially less than about 10 mils. The openings should not be larger than about 60 mils in diameter, and preferably not larger than about 40 mils in order to provide adequate protective coverage.

Figure 10:
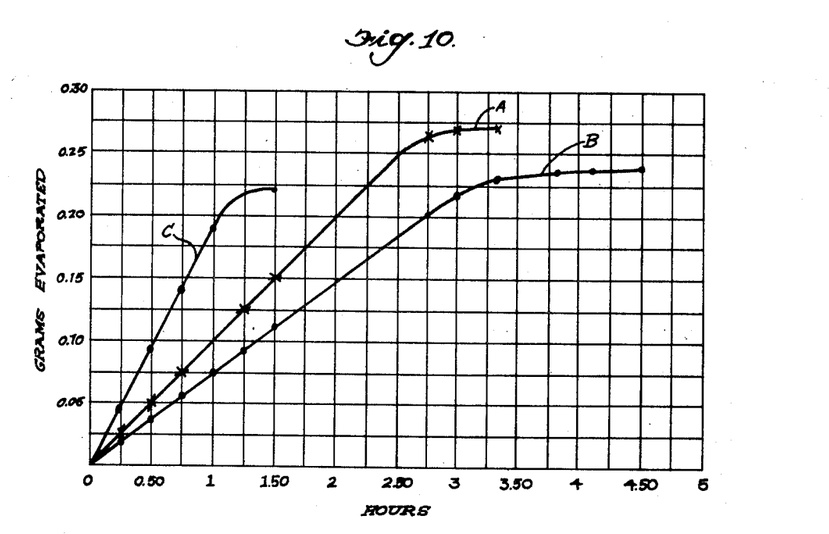
FIGS. 10 and 11 are graphic illustrations of the influence of hole size, number of holes and open area upon ventilation of perforated backings.

For any given amount of open area the rate at which fluid will evaporate from a surface beneath the tape depends upon the number of openings in and uniformly distributed throughout the backing. The effect of the number of holes in the backing upon evaporation rate, for a given open area, is illustrated in FIG. 10. The data represented by FIG. 10 were obtained in the following manner.

EXAMPLE A

A surgical pad conventionally used on commercial adhesive tape finger bandages having an area of about 0.586 square inch was placed between two aluminum foil panels. The edges of the two panels were sealed together against moisture penetration or escape at the sealed edges, thereby forming an envelope in which the pad was encased. The area of the central portion of each of the panels within the boundaries of the sealed edges was about 0.844 sq. inch. The central portion of the top panel was uniformly perforated with 200 holes, each having a diameter of about 0.0145 of an inch. The percentage of open area in the top panels was about 3.91%. The pad was then saturated with water, allowed to stand until the outside of the envelope was dry, weighed, and placed in a constant temperature oven (37.5° C.). The pad and envelope were weighed at intervals over a period of about five hours. The amount of water which evaporated at each interval was determined and plotted as shown in Curve A of FIG. 10.

EXAMPLE B

A pad and envelope were prepared exactly as in Example A, except that the top panel was perforated with 43 holes each having an average diameter of about 0.0314 of an inch. The percentage of open area in the perforated panel was about 3.95%, substantially the same open area of Example A. The rate of evaporation of water from the saturated pad was determined in the same manner as in Example A. These data are plotted as Curve B in FIG. 10.

EXAMPLE C

A control was run wherein the central portion of the top panel of an envelope was removed, completely exposing the surface of the pad. The amount of water which evaporated from this uncovered pad was determined in the same manner as in Examples A and B. Curve C in FIG. 10 represents the data from this example.

The pads of Examples A, B, and C were saturated with about 0.27, 0.26 and 0.22 gram of water, respectively. For all practical purposes, the top panels of Examples A and B had substantially the same percentage open area. The pad of Example A covered with the foil having the smaller diameter holes approached dryness at a faster rate than did the pad of Example B covered with a foil having the larger diameter holes.

Figure 11:
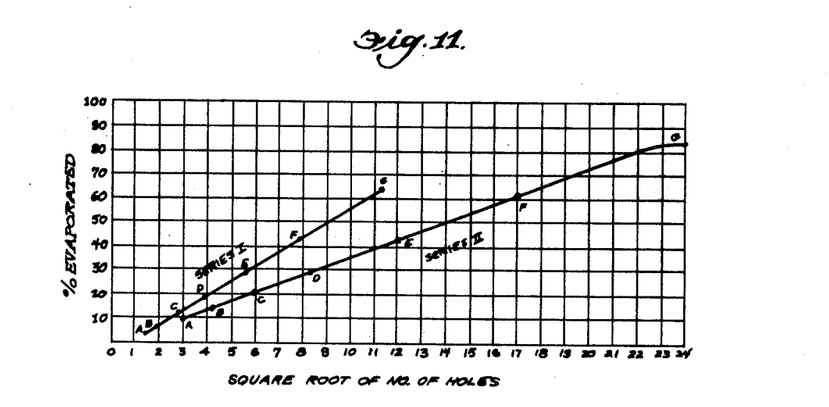

FIGURE 11 shows that for small holes of the same diameter, the rate of evaporation varies directly with the square root of the number of holes in the backing up to the point, of course, where the rate of evaporation approaches the rate of evaporation of the uncovered pad. Thus, the amount of water evaporated from beneath a perforated backing in a given amount of time is substantially increased as the distance between the perforations is decreased. Uniformity in the spacings between holes becomes less important as the number of holes distributed throughout the tape increases. Two series of enveloped pads were prepared identically the same as the enveloped pads of Examples A and B, except as to the number of perforations. The two series are as follows:

| Examples | Series I Hole diam.: 0.0314″ | | Series II Hole diam.: 0.0145″ | |
|---|---|---|---|---|
| | Number of holes | Percent open area | Number of holes | Percent open area |
| A | 2 | 0.18 | 9 | 0.18 |
| B | 4 | 0.36 | 18 | 0.37 |
| C | 8 | 0.70 | 36 | 0.73 |
| D | 16 | 1.41 | 72 | 1.47 |
| E | 32 | 2.82 | 144 | 2.94 |
| F | 64 | 5.64 | 288 | 5.87 |
| G | 128 | 11.27 | 576 | 11.75 |

A control example was also run, the pad being uncovered on one side. All of the pads were saturated with substantially the same amount of water. The amount of water evaporated at ordinary room temperature was determined at intervals by weighing for water loss in the pads. The amount of water lost at about 3½ hours of drying at room temperature in each of the Series I and Series II Examples was determined and divided by the amount of water loss in the control example after it had been dried at room temperature as indicated by constant weight. The quotient obtained, multiplied by 100, is the percentage of fluid evaporated, based upon the amount of water evaporated from the exposed pad. In FIG. 11, these percentage figures are plotted against the square roots of the number of holes in the foil panels.

It is obvious that ventilation is best obtained with backings containing at least hundreds of holes per unit area, preferably at least about 200 holes per square inch, for smaller holes having diameters of about 0.040 of an inch and less. These smaller macroscopic holes, of course, provide better protection against contamination. Ideally, the entire backing, both under the pad and the portions extending beyond the pad, should be perforated to the equivalent of at least about 200 holes per square inch.

Surprisingly, the adhesive tapes of the above described structure of this invention exhibit substantially greater tensile strength and elongation at the point of breaking than the same tape having substantially the same number of perforations of substantially the same size, but devoid of thickened grommet-like formations surrounding the perforations in the thermoplastic film backing. To some degree, the conformability of an adhesive tape is dependent upon the ability of the tape backing to stretch. The tapes of this invention have much better conformability characteristics in this respect than an adhesive tape made with the same thermoplastic film in which the perforations have been punched or die-cut.

Equally surprising, the perforated films used in the construction of the tapes of this invention are substantially more resistant to tearing than tapes made from the conventional punched or die-cut perforated thermoplastic films. The tapes of this invention generally have a greater tear resistance than tapes made with the same imperforate thermoplastic film. Thus, the adhesive tapes of this invention are tapes which are highly perforated with small holes, providing excellent ventilation and satisfactory protective and covering properties.

Table I compares the tensile strengths of imperforate and perforated biaxially oriented polyethylene terephthalate films. The films were 0.25 of a mil thick. The perforated films having grommets surrounding the holes were made in the same manner, by a localized melting and cooling process as will be more particularly described hereinafter. Since punched or die-cut thermoplastic perforated films having as many as 200 to 400 holes per square inch were unavailable, samples of the films having grommets surrounding the perforations were immersed in methylene chloride to remove the grommets from the films. The perforated films identified in Table I as being immersed in methylene chloride are films in which the grommets are completely or substantially completely removed, and thus approximate the structure of perforated films that would be produced by a punching or die-cutting operation. As indicated in Table I, the first five films were tested for tensile strength upon a Scott Tester, Model J, using a 25 pound full scale. The last four films tabulated in Table I were tested on an Instron Tensile Tester, which is more accurate than the Scott Tester within the range of the tensile strengths of these thin films. Samples of films approximately 6 inches long and accurately die-cut to 1 inch in width were used with both Testers. The gauge distance was about 3 inches and the rate of jaw sepaartion was about 1 inch per minute. In order to determine the effect of the immersion of the films in methylene chloride upon the tensile strength of the film, imperforate samples of the film from which the perforated films were produced were also tested for tensile strength on the Instron. As is apparent, the loss in tenslie strength of a perforated film which has also been immersed in methylene chloride is greater than the loss which can be accounted for by the methylene chloride immersion. The tensile strength of a film perforated to have grommets surrounding the holes is not as drastically reduced as is the tensile strength of a film which is perforated without grommets around the holes.

*Table I*

| Holes/in.²; pattern | Hole diameter, inches | Percent of surface perforated | Tensile strength | Percent reduction in tensile strength |
|---|---|---|---|---|
| Scott tensile test: | | | | |
| Imperforate | | 0 | 2.2 | |
| 237; staggered | a 0.025 | 11.6 | 2.0 | 9 |
| 237; staggered | b .033 | 20 | 0.95 | 56 |
| 233; straight | a .033 | 19.9 | 1.7 | 22 |
| 233; straight | b .040 | 30 | 0.8 | 63 |
| Instron tensile test: | | | | |
| Imperforate | | 0 | 4.80 | |
| Imperforate b | | 0 | 4.28 | 10.8 |
| 379; staggered | a 0.022 | 14.4 | 3.78 | 21.3 |
| 379; staggered | b 0.024 | 17.1 | 2.84 | 33.4 | a Grommets surrounding holes.
b Immersed in methylene chloride.

In Table II the tensile strength, tear strength, and the percent of elongation of various perforated films are compared. All of the perforated films in Table II were made by the localized melting and cooling process to be described hereinafter. All of the films were biaxially oriented polyethylene terephthalate, except the last six samples of Table II. The last six films were vinylidene chloride-vinyl chloride copolymer films. The first four of these last six films were made from different lots of 1 mil imperforate vinylidene chloride-vinyl chloride films; therefore, the tensile strength of the imperforate film from each lot is recorded.

In both Tables I and II the tensile strength is expressed in terms of pounds per inch width of film. All of the films of Table II were tested for tensile strength on the Instron Tensile Tester in the manner previously described. The extent to which the film elongated at the point of breaking was measured. The percent of elongation was calculated and is shown in Table II. The tear strength for each of the films recorded in Table II is the average force in grams required to tear the film after a tear was initiated at an edge of the film. More properly, this test measures the resistance of the film to propagation of a tear. The films were tested for tear strength on an Elmendorf Tearing Tester in a manner similar to the method for testing paper described in ASTM Designation: D 689–44, using 8 plies of film and then converting the Elmendorf readings to grams required to tear a single film. It is to be understood that the terms "tear strength" or "tear resistance" as used herein means the resistance of the films to continuation of a tear in the direction of a slit or tear initiated at an edge of the film, the path of tearing passing through perforations in the perforated film.

The process of this invention provides an operation of adhesively coating a perforated film to produce a perforated adhesive tape wherein predominantly all of the perforations are substantially free from an obstructing adhesive film across the perforations. Essentially, the process of this invention involves the steps of contacting a perforated backing with the surface of a layer of a pressure-sensitive adhesive mass, the cohesive strength of which is temporarily reduced so that the layer of adhesive can be easily split, and then stripping the perforated film therefrom. The cohesive strength can be reduced temporarily, for example, by diluting the adhesive with a suitable solvent, such as used in conventional solvent spreading of adhesive on backings, or by heating the adhesive to an elevated temperature, such as employed in calendering spreading of the adhesive. In both instances, the cohesive strength is reduced by means suitable to reduce the viscosity of the adhesive. The adhesive in this condition is aggressively tacky and exhibits a high degree of adhesion. While in contact with the surface of this layer of pressure-sensitive adhesive, movement of the perforated film is carefully controlled so as to prevent relative movement between the film and the layer of the adhesive. Relative movement between the perforated backing and the adhesive may result in clogging the holes with the adhesive. The perforated backing is then removed from the surface of the adhesive layer by separating the perforated film at an angle from the layer of the adhesive solution. Upon separation in this manner, a thin coating of the adhesive, temporarily weakened cohesively, is split from the adhesive layer and

*Table II*

| Film thickness, mils | Holes/in.²; pattern | Hole diameter, inches | Percent of surface perforated | Tensile strength | Percent reduction in tensile strength | Tear strength | Percent elongation |
|---|---|---|---|---|---|---|---|
| 0.25 | | | 0 | 3.89 | | 3.6 | 26.2 |
| 0.25 | 714; staggered | 0.013 | 9.5 | 2.63 | 32 | 8.0 | 52.7 |
| 0.25 | 400; straight | .020 | 12 | 3.01 | 22 | 8.8 | 45.0 |
| 0.25 | 237; staggered | .025 | 11.6 | 3.55 | 8.7 | 10.4 | 46.5 |
| 0.25 | 233; straight | .033 | 19.9 | 3.0 | 22 | 15.6 | 37.5 |
| 0.25 | 233; straight | .038 | 26.4 | 2.27 | 41 | 10.8 | 29.0 |
| 0.25 | 83; straight | .072 | 33.8 | 2.65 | 31 | 12.0 | 37.0 |
| 1 | | | 0 | 18.36 | | 28.8 | 64.5 |
| 1 | 83; straight | 0.072 | 33 | 10.20 | 44 | 55.2 | 68.5 |
| 1 | 72; staggered | .073 | 30.1 | 11.48 | 37 | 56.4 | 106 |
| 1 | | | 0 | 9.5 | | 17 | |
| 1 | 233; straight | 0.033 | 26 | 7.5 | 21 | 36 | |
| 1 | | | | 7.3 | | | |
| 1 | 379; staggered | 0.019 | 10.7 | 5.9 | 19 | | |
| 2 | | | | 13.3 | | | |
| 2 | 379; staggered | .019 | 10.7 | 8.6 | 34 | | |

For any given open area the tape with the larger number of holes, and hence holes of smaller size, is to be preferred. The stretchability of the perforated films is not deleteriously affected and, in fact, is greater than the stretchability of the perforated films devoid of thickened grommet-like portions surrounding the perforations. The tear strengths of the perforated films forming the backings of the tapes of this invention are considerably greater than the tear strengths of perforated films having no grommet-like thickened portions surrounding the holes. Indeed, these perforated films exhibit tear strengths greater than the tear strengths of the imperforate films.

The improved tear resistance of these perforated films is particularly advantageous in adhesive tapes in which a high hole density is desired. In punched or die-cut perforated plastic adhesive tapes, care must be taken that all of the perforations occur within the edges of the tape. If the punched or die-cut holes are made on an edge of the tape, these cut edges act as slits in the film at which point a tear can be easily initiated. In comparison, the perforations in the tape products of this invention can occur on the edge of the adhesive tape and will not impair the tear resistance of the tape. The grommet-like formations around the holes in the tape of this invention are free of radial tears or slits.

remains adherent to the matrix surface of the perforated film. The adhesive coating completely covers the matrix surface. During this coating operation, the perforated film is not pressed into the adhesive layer, but merely rests upon the surface of the layer of the adhesive, preferably with no greater pressure than that due to the weight of the film.

After this coating operation, the coating of the adhesive as applied is conditioned to restore or change the cohesive strength of the adhesive to the state in which it is suitable for use as a pressure-sensitive adhesive under normal conditions. Thus, in the case of a solution of the adhesive, the adhesive coating is dried to remove the solvent. If a hot or molten coating of adhesive is applied, the adhesive coating is cooled. Conventional normally tacky pressure-sensitive adhesive formulations, generally known as the rubber-resin type of adhesive, are suitable.

Figure 6:
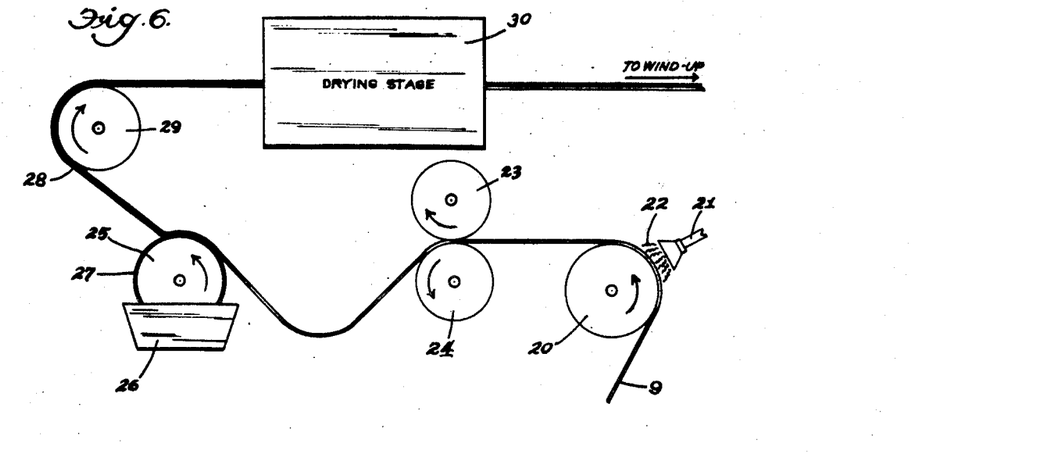
FIG. 6 is a schematic diagram of a process of making adhesive tapes of this invention and illustrating the process of applying the adhesive to a pre-perforated backing.

This coating process is schematically shown in FIG. 6 as one step in a continuous process of perforating the film, coating the same with an adhesive solution and then drying the coated perforated film prior to sending the tape to a wind-up stage. The perforating steps shown in FIG. 6 is a method by which perforated film with thickened areas surrounding the perforations can be produced. It is to be understood, of course, that the method of perforating the thermoplastic film material is not within the scope of this invention.

Referring specifically to FIG. 6, a suitable thermoplastic film in its imperforate state, identified by the numeral 9, is passed around a roll 20 rotating in the direction shown by the arrow. The roll 20 has a grid-like surface consisting of a continuous surface surrounding a multiplicity of holes or depressions distributed throughout the surface of said roll. The surface of the rotating roll 20 is cooled in any appropriate manner, for example, by means of a cool air jet upon the circumferential surface of the roll. A gas burner 21 directs a hot gas flame 22 upon the surface of the film 9 as it passes around and in contact with the rotating roll 20. The gas flame 22 is maintained at a temperature sufficient to melt the portions of the film which lie over the perforations or depressed areas in the roll 20. The continuous surface of the roll 20 surrounding the depressed areas or perforations therein serves to cool the film in contact therewith and prevents the film from melting in the area of contact. As the film melts in the areas over the depressed areas or perforations in the roll 20 the melted thermoplastic material contracts to form an opening and then solidifies as the melted material accumulates along the surface of the roll surrounding each of the depressed areas or perforations. These solidified portions of the film are thicker than the remaining matrix surface remaining in the perforated film, as shown in FIGS. 1–3.

The perforated film is then passed through the nip between rolls 23 and 24 which frictionally engage the perforated film 10 to direct the film away from roll 20 and towards the coating station. Rolls 23 and 24 are driven by suitable means, not shown, as is the perforating roll 20. The speeds of these rolls are regulated so that the linear speed of the film is the same as the speed of the circumferential surface of the perforating roll 20.

The coating station in FIG. 6 consists of a rotating applicator roll 25 which is partly submerged in a solvent solution of a pressure-sensitive adhesive in the container 26. As the applicator roll 25 rotates in the direction of the arrow it picks up a layer of pressure-sensitive adhesive 27 on its surface. The perforated film 10 is brought into contact with the outer surface of the adhesive layer 27 and then subsequently is separated from the adhesive layer by removing the perforated film at an angle to the adhesive layer 27, such as is diagrammatically shown in FIG. 6.

When the perforated film 10 is separated from the adhesive layer 27 a thin coating 28 of the adhesive is split or stripped from the layer 27 and adhered to the perforated film, uniformly covering the entire surface of the matrix of the film. In order to prevent obstruction of the perforations with the adhesive, the speed of the moving film 10 is maintained at the same rate of movement as the surface of the adhesive layer 27. Neither the film 10 being coated nor the applicator roll 25 act as a drive means for each other. The speed and movement of each may be separately controlled in any suitable manner to prevent relative movement in either a longitudinal or transverse direction between the perforated film 10 and the adhesive layer 26 while they are in contact with each other.

Obstruction of the holes with the adhesive is further avoided by the absence of application of any pressure means to force the perforated film into the adhesive. Pressure rolls are not necessary to hold the perforated film 10 on the surface of the adhesive layer 27 since adhesion between the perforated film and the adhesive layer holds the film temporarily in place. As shown in FIG. 6, the perforated film is maintained in temporary adhesive contact with the adhesive layer 27 through a portion of its travel by the weight of the perforated film resting upon the surface of the adhesive layer 27. The adhesively coated perforated film is then passed around a roll 29 and directed through a suitable drying step, such as drying oven 30. Any solvent remaining in the adhesive coating 28 is removed at this step. The dried, perforated adhesive tape is then directed to a wind-up spool, not shown. Alternatively, the perforated adhesive tape may be fed directly to a slitter where the tape may be split into convenient widths and lengths, and then wound up on spools, or further processed into adhesive tape bandages. Thus, an advantage of this method of adhesively coating a perforated backing suitable for adhesive tape is that it can be used in a continuous uninterrupted production process.

Figure 7:
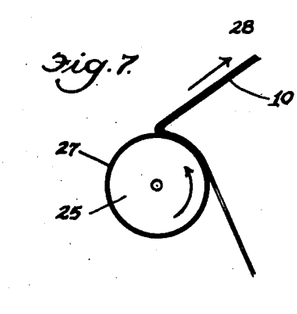
FIGS. 7, 8 and 9 are modifications of the process of this invention.
Figure 8:
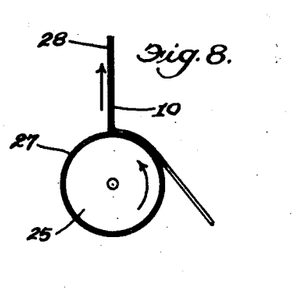
Figure 9:
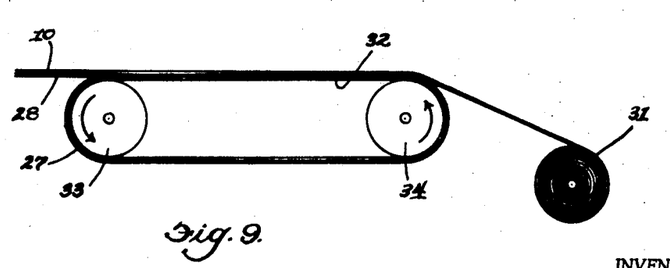

Modifications of this process, other than those already mentioned, may be made. Some of the modifications are shown in FIGS. 7–9, which illustrate various angles at which the perforated film 10 can be stripped from the surface of the temporarily cohesively weakened adhesive layer 27. FIG. 7 shows the perforated film being removed from the adhesive layer at a sharp pull-off angle. FIG. 8 shows a pull-off at an approximately 90° angle. The pull-off angle referred to is the angle between the line of direction of the film taken off the adhesive layer 27 and a line drawn tangent to the surface of the layer at the point of take-off and extending in a direction generally opposite to the direction of travel of the adhesive layer at said point.

The pull-off angle is determined by the thickness of the film and the cohesive strength of the adhesive layer 27. A thick film will require a sharper or more acute pull-off angle than a thin film for an adhesive layer of given cohesive strength or viscosity. An adhesive layer 27 of high viscosity or cohesive strength will require a sharper pull-off angle than an adhesive layer of lower viscosity or cohesive strength for coating a film of the same thickness. As specific embodiments of these principles, for example, perforated vinylidene chloride-vinyl chloride films about one mil thick, having about 380 holes per square inch, the holes being about 19 mils in diameter, were coated with a normally tacky pressure-sensitive adhesive in accordance with this invention employing a sharp pull-off angle of about 45 degrees when the viscosity of the adhesive layer on the applicator roll was about 8000 cps. With a more viscous adhesive layer, about 135,000 cps., the pull-off angle was about 100 degrees. A thin coating of the adhesive adhered to the matrix surface of the perforated films. During pull-off of some of the films a thin adhesive layer formed across an occasional few perforations, but the majority of these adhesive films ruptured by the time the adhesive coated perforated film was passed through the drying oven, thereby leaving predominantly all of the holes completely or substantially free of adhesive. The pressure-sensitive adhesive was composed of a blend of equal parts, by weight, of natural rubber, a mixture of resins, and filler. The resin mixture consisted of rosin, rosin ester and hydrogenated rosin. The filler was zinc oxide. The adhesive components were dispersed in a suitable amount of heptane to give an adhesive layer having a viscosity of 8000 cps. For the more viscous layer, toluene was used as the solvent.

In FIG. 9, the perforated film 10 is fed from a roll 31 to the surface of an adhesive layer 27 carried on a moving conveyor belt 32 moving in the direction shown continuously around a roll 33 suitably driven and a freely rotating roll 34. The perforated film 10 with an adhesive coating 28 is shown taken from the end of the top path of the conveyor belt 32. The perforated film may be stripped at any prior point since the length of time the film dwells upon the surface of the adhesive layer 27 need only be sufficient to develop wetting or anchorage of adhesive on the matrix surface of the film. The dwell time need not be greater than a few seconds and not greater than the time in which the perforated film will sink deeply into the surface of the adhesive layer 27. The short dwell time during the coating step thus facilitates fast operating speeds.

In order to improve the anchorage of the adhesive to the perforated backing, suitable primers known in the art may be employed. The primer may be applied to the film either before or after the perforating step. Various thermoplastic polymeric films may be employed as the perforated backings of the surgical adhesive tapes of this invention. In particular, polymeric films which contract upon melting, such as crystalline polymers in an oriented state, readily and easily form thickened grommet-like formations around melting perforated openings in the films. Relatively thin films, usually not exceeding about 0.006 of an inch in thickness, are preferred for surgical adhesive tapes. Suitable films are films made from polymeric vinylidene chloride-vinyl chloride; plasticized vinylidene chloride-vinyl chloride polymers, for example, Saran 54L; polyethylene terephthalate polymers, for example, Mylar; and crystalline polyethylene, to name a few.

As various embodiments may be made in the invention described herein and since many different changes in the embodiments set forth are to be expected, it is to be understood that the teachings disclosed herein are to be interpreted as illustrative and not in a limiting sense. It should be apparent that this invention may be practiced to produce products of varying degrees of excellence, for example, in respect to the freedom of adhesive in the perforations. Ideally, the tape should be completely free of adhesive extending into the openings defined by the perforations in the tape backing. However, the demands of high-speed production, for example, may make accurate control of processing variables difficult, with the result that the adhesive coating may extend beyond the peripheral edges of some of the perforations. Accordingly, it should be clearly understandable that the ventilated tapes of this invention in which the perforations are considered as being free of adhesive, such as for the purpose of providing ventilation in surgical tapes, are tapes which are from completely to substantially free of adhesive extending into the openings defined by the perforations in the tape backing. Embodiments within the scope of this invention include perforated tapes in which the perforations are circular or otherwise, and in which the perforations are arranged in regular or irregular patterns.

This application is a division of application Serial No. 14,644, filed on March 14, 1960, now issued as Patent 3,073,303.

What is claimed is:

1. A method of forming a coating of a pressure-sensitive adhesive on a tape backing having openings therein without obstructing said openings with an adhesive membrane bridging said openings, comprising the steps of:
   (a) coating a supporting surface with a layer of a pressure-sensitive adhesive, the cohesive strength of which is temporarily reduced to the extent that the adhesive layer can be easily split;
   (b) applying said tape backing on the surface of said adhesive layer under pressure insufficient to press said backing into said layer, but sufficient to maintain the backing in adhesive contact with the surface of said adhesive layer; and
   (c) separating said backing from the cohesively weak adhesive layer at an angle thereto to transfer a thin coating split from the adhesive layer to the portions of the backing in contact with the adhesive.

2. A method of forming a coating of a pressure-sensitive adhesive on a perforated film without obstructing the openings in said film with an adhesive membrane bridging said openings, comprising the steps of:
   (a) coating the surface of a moving carrier with a layer of a solution of a pressure-sensitive adhesive containing solvent in an amount sufficient to provide a cohesively weak layer that can be easily split;
   (b) applying a moving perforated film on the surface of said adhesive layer under pressure insufficient to press said backing into said layer, but sufficient to maintain the film in adhesive contact with the surface of said adhesive layer;
   (c) maintaining the speeds and directions of the moving adhesive layer and the perforated film in contact therewith the same to avoid relative longitudinal and transverse movement between the adhesive layer and the perforated film;
   (d) separating said perforated film from the cohesively weak adhesive layer in a direction divergent from the direction of travel of said moving layer at an angle thereto to transfer a thin coating split from the adhesive layer to the matrix portions of the film; and
   (e) drying the adhesive coating on the perforated film to remove the solvent therefrom.

3. The method of claim 2 wherein said perforated film contains at least about 200 microscopic openings therethrough per square inch of film each equivalent in size to a circular opening no greater than about 40 mils in diameter.

4. The method of claim 2 wherein the angle at which the film is separated from the adhesive layer is less than 180° as measured between the line of direction of the coated film separated from said cohesively weak adhesive layer and a line drawn tangent to the surface of the layer from the point of separation extending in a direction generally opposite to direction of travel of the adhesive layer at said point.

5. The method of claim 2 wherein the angle at which the film is separated from the adhesive layer is about 100°.

6. The method of claim 2 wherein the angle at which the film is separated from the adhesive layer is about 45°.

7. The method of claim 2 wherein the viscosity of the pressure-sensitive adhesive solution is from about 8,000 to 135,000 c.p.s.

8. A method of forming a coating of a pressure-sensitive adhesive on a perforated film without obstructing the openings in said film with an adhesive membrane bridging said openings, comprising the steps of:
   (a) coating the surface of a moving carrier with a layer of a pressure-sensitive adhesive heated to a temperature to reduce the cohesive strength of said layer to the extent that the layer can be easily split;
   (b) applying a moving perforated film on the surface of said adhesive layer under pressure insufficient to press said backing into said layer, but sufficient to maintain the film in adhesive contact with the surface of said adhesive layer;
   (c) maintaining the speeds and directions of the moving adhesive layer and the perforated film in contact therewith the same to avoid relative longitudinal and transverse movement between the adhesive layer and the perforated film;
   (d) separating said perforated film from the cohesively weak adhesive layer in a direction divergent from the direction of travel of said moving layer at an angle thereto to transfer a thin coating split from the adhesive layer to the matrix portions of the film; and
   (e) cooling the adhesive coating on the perforated film.

9. A method of forming a coating of a pressure-sensitive adhesive on a perforated film without obstructing the openings in said film with an adhesive membrane bridging said openings, comprising the steps of:
   (a) coating the surface of a moving carrier with a cohesively weak adhesive layer of a solution of a pressure-sensitive adhesive having a viscosity of from about 8,000 to 135,000 cps. and that can be easily split;
   (b) applying a moving perforated film on the surface of the adhesive layer under pressure insufficient to press said backing into said layer, but sufficient to maintain the film in adhesive contact with the surface of said adhesive layer, said perforated film containing at least about 200 macroscopic openings therethrough per square inch of film each equivalent in size to a circular opening no greater than about 40 mils in diameter;

(c) maintaining the speeds and directions of the moving adhesive layer and the perforated film in contact therewith the same to avoid relative longitudinal and transverse movement between the adhesive layer and the perforated film;

(d) separating said perforated film from the cohesively weak adhesive layer in a direction divergent from the direction of travel of said moving layer at an angle less than 180° as measured between the line of direction of the film separated from said cohesively weak adhesive layer and a line drawn tangent to the surface of the layer from the point of separation extending in a direction generally opposite to the direction of travel of said adhesive layer at said point to transfer a thin coating split from the adhesive layer to the matrix portions of the film; and (e) drying the adhesive coating on the perforated film to remove the solvent therefrom.

10. A method of forming a coating of a pressure-sensitive adhesive on a perforated film without obstructing the openings in said film with an adhesive membrane bridging said openings, comprising the steps of:

(a) coating the surface of a moving carrier with a layer of a pressure-sensitive adhesive heated to a temperature to reduce the cohesive strength of said layer to the extent that the layer can be easily split;

(b) applying a moving perforated film on the surface of the adhesive layer under pressure insufficient to press said backing into said layer but sufficient to maintain the film in adhesive contact with the surface of said adhesive layer, said perforated film containing at least about 200 macroscopic openings therethrough per square inch of film each equivalent in size to a circular opening no greater than about 40 mils in diameter;

(c) maintaining the speeds and directions of the moving adhesive layer and the perforated film in contact therewith the same to avoid relative longitudinal and transverse movement between the adhesive layer and the perforated film;

(d) separating said perforated film from the cohesively weak adhesive layer in a direction divergent from the direction of travel of said moving layer at an angle less than 180° as measured between the line of direction of the film separated from said cohesively weak adhesive layer and a line drawn tangent to the surface of the layer from the point of separation extending in a direction generally opposite to the direction of travel of said adhesive layer at said point to transfer a thin coating split from the adhesive layer to the matrix portions of the film; and (e) cooling the adhesive coating on the perforated film.

No references cited

RICHARD D. NEVIUS, *Primary Examiner.*

UNITED STATES PATENT OFFICE

CERTIFICATE OF CORRECTION

Patent No. 3,183,116                      May 11, 1965

Charles H. Schaar

It is hereby certified that error appears in the above numbered patent requiring correction and that the said Letters Patent should read as corrected below.

Column 6, line 43, for "sepaartion" read -- separation --; line 48, for "tenslie" read -- tensile --; column 12, line 17, for "microscopic" read -- macroscopic --.

Signed and sealed this 12th day of October 1965.

(SEAL)
Attest:

ERNEST W. SWIDER
Attesting Officer

EDWARD J. BRENNER
Commissioner of Patents